Jan. 26, 1971  T. A. LA VIGNA  3,559,031
BUCK-BOOST VOLTAGE REGULATION CIRCUIT
Filed Oct. 6, 1969  2 Sheets-Sheet 1

INVENTOR
Thomas A. LaVigna

BY
ATTORNEYS

Jan. 26, 1971 T. A. LA VIGNA 3,559,031
BUCK-BOOST VOLTAGE REGULATION CIRCUIT
Filed Oct. 6, 1969 2 Sheets-Sheet 2

INVENTOR
Thomas A. LaVigna

BY
ATTORNEYS

United States Patent Office 3,559,031
Patented Jan. 26, 1971

3,559,031
BUCK-BOOST VOLTAGE REGULATION CIRCUIT
Thomas A. La Vigna, Bowie, Md., assignor to the United States of America as represented by the Administrator of the National Aeronautics and Space Administration
Filed Oct. 6, 1969, Ser. No. 863,963
Int. Cl. H02m 3/24
U.S. Cl. 321—2                                                   6 Claims

ABSTRACT OF THE DISCLOSURE

The invention relates to a buck-boost voltage regulator wherein the output of a DC voltage source to be controlled is combined with a source of alternating current from an inverter. The resultant signal is applied to a chopper circuit. The chopper circuit utilizes a pair of switching transistors alternately maintained in conduction by a single current transformer and an inductive load. The chopper circuit is designed to permit instantaneous switching between the transistors and is further designed to prevent simultaneous conduction thereof. This allows operation of the chopper circuit through a wide range of frequencies without any long commutation intervals and thereby prevents short circuits from being applied through the transformer to the inverter.

---

The invention described herein was made by an employee of the United States Government and may be manufactured and used by or for the government for governmental purposes without the payment of any royalties thereon or therefor.

The present invention relates to a DC regulator, and more particularly to a source of additive or subtractive alternating current which is impressed upon a variable DC source voltage to produce a regulated output voltage. Also, the invention can be used to provide a controlled output from a constant DC source. The circuit according to the present invention includes a source of AC current internally generated by an inverter which is paralleled to the main DC input to provide an additive or subtractive voltage component. The inverter includes a squarewave oscillator which complimentary controls switching action between a pair of transistors, the conduction of either of which transistors allows the main DC input, to appear across the primary windings of a transformer. This input voltage is coupled by autotransformer action to the transformer secondary and provides an AC voltage which is combined with the input and then applied to a chopper circuit comprising a pair of power transistors. Switching action for the power transistors is controlled by a slave squarewave multivibrator which is coupled in phase displaced relationship from the master multivibrator through a magnetic amplifier. The phase displacement between the master and slave multivibrator is variable and produces the required switching of the power transistors between conducting and non-conducting states. Such conducting or non-conducting states of the power transistors causes the impressed voltage from the inverter to be either additive or subtractive as required to regulate the DC output at a fixed regulated voltage for any change of line or load conditions.

The subtractive mode of operation is achieved in a novel manner by maintaining a respective one of the power transistors in a conduction state by an inductive load and a pair of current transformer windings at a time when the opposite voltage polarity is present at the active secondary winding of the power transformer $T_1$ as compared to the input. More particularly, the inductive load with the current transformer is designed to delay switching off of the conducting power transistor. The current transformer windings will then continue to supply drive to the conducting transistor. Since the inverter transformer winding is of opposite voltage polarity, it impresses a subtractive voltage upon the input DC voltage. When the time interval of this buck portion exceeds the time interval of the boost portion, the resultant output, when averaged, will be reduced with respect to the DC input.

The chopper circuit utilizing the power transistors according to the present invention represents an improvement over prior art voltage regulators, such as the one disclosed in Pat. 3,401,329. In such a prior art device, additive or subtractive voltage components are supplied through switching silicon controls rectifiers. During a commutation interval occasioned by the time required for the conducting SCR to regain its blocking state, both SCRs are conducting and a momentary short circuit is applied across the secondary windings of a power transformer supplying the AC. During this interval, high-power dissipation takes place, thereby drastically limiting the regulator to low frequency operation.

In the circuit of the present invention, switching off of the conducting power transistor takes place instantaneously through the action of the drive circuit and one power transistor cannot be biased to a conducting state until the other has turned completely off. Accordingly, no short circuit is applied to the inverter power transformer supplying the AC source, and there is no interval wherein high power is dissipated. Thus, the regulator of the present invention is operable over a wide range of frequencies with greater power efficiency than the described prior art regulator. Additionally, the chopper circuit utilizing the power transistors may be modified in another preferred embodiment of the invention to include current overload protection. And, in addition, the magnetic amplifier can be provided with a current regulator control winding to override the voltage control signal.

Accordingly an object of the invention is to provide a buck-boost control circuit wherein an impressed voltage is internally generated by an inverter and a cooperating autotransformer.

A further object of the invention is to provide a buck-boost voltage control circuit wherein bucking operation is achieved by maintaining power transistors in conducting states by a single current transformer and an inductive load.

Another object of the present invention is to provide a buck-boost voltage control circuit wherein an inverter is coupled by a phase displacing circuit to a power transistor switching circuit.

Another object of the invention is to provide a power switching circuit which operates over a wide range of frequencies with minimum power loss and which impresses an AC inverter output in buck or boost operation upon an input DC source.

Another object of the invention is to provide a power switching circuit which impresses an AC output of an inverter upon an input DC source, and further operates to provide overload protection for the inverter.

Other objects and many attendant advantages of the present invention will become apparent from perusal of the following detailed description taken in conjunction with the accompanying drawings wherein.

Figure 1:
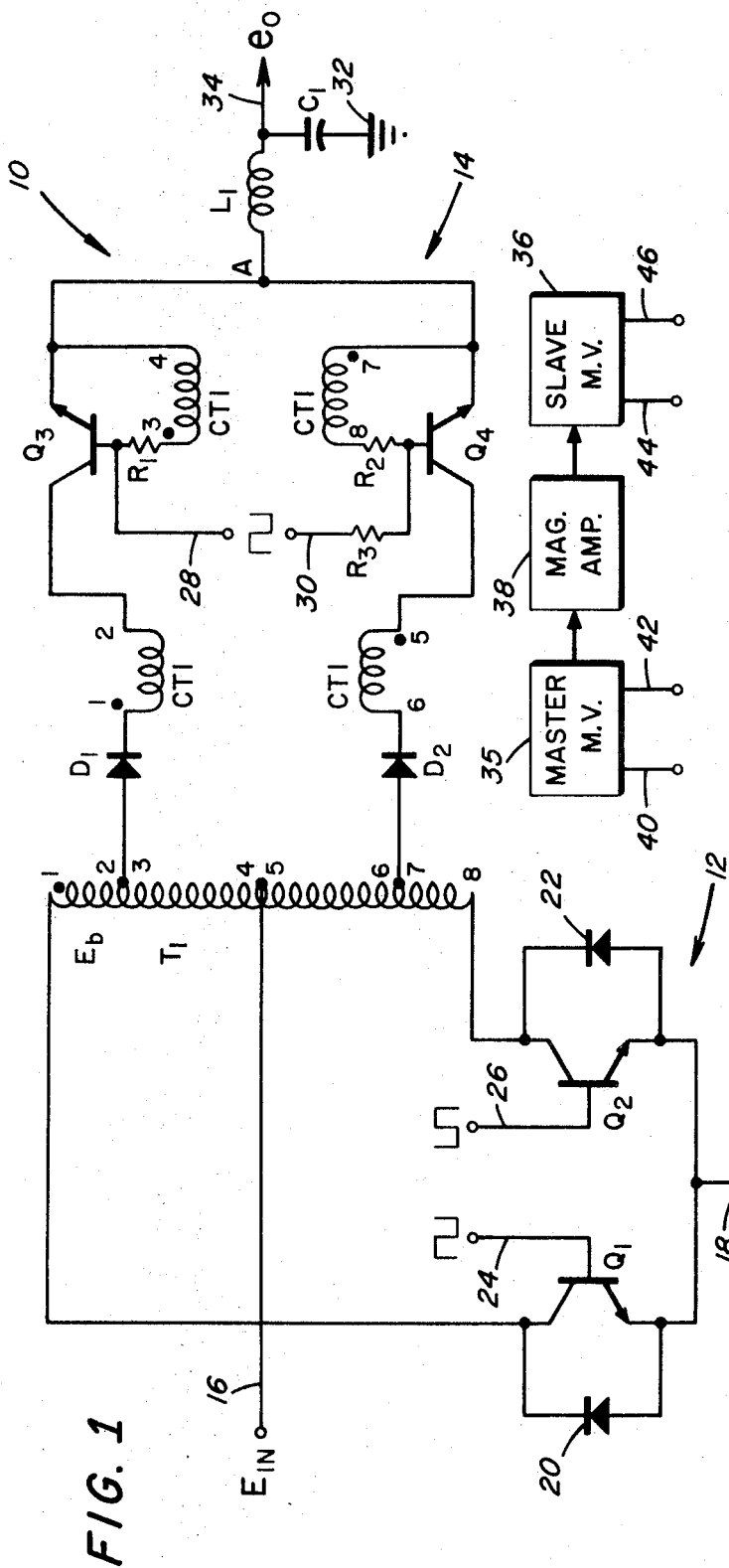
FIG. 1 is a schematic diagram of a preferred embodiment of the buck-boost regulator according to the present invention.

With more particular reference to the drawings, there is illustrated in FIG. 1, generally at 10, a buck-boost regulator according to the invention.

A transformer $T_1$ has an inverter 12 coupled to its primary windings at taps 1 and 8 and a chopper circuit or power switching circuit 14 coupled to taps 2–3 and 6–7 of its secondary.

A first terminal 16 is coupled to points 4–5 of the transformer and provides an input terminal for a variable DC source, the output of which is to be controlled. The inverter 12 is illustrated in its most elementary form and comprises the usual opposed NPN transistors $Q_1$ and $Q_2$ coupled to ground at 18. The transistors are provided with the familiar pump back diodes 20 and 22, respectively connected across their emitters and collectors. Transistor $Q_1$ is provided with an input terminal 24 at its base. In similar fashion, transistor $Q_2$ is provided with an input terminal 26 to its base.

The power switching circuit 14 is coupled to point 2–3 of the transformer secondary by an input diode $D_1$ associated with windings 1–2 of a current transformer CT1, connected directly to the collector of a first switching power transistor $Q_3$. In similar fashion the power switching circuit 14 is connected to point 6–7 of the transformer by an input diode $D_2$. Windings 6–5 of the current transformer are directly connected to the input diode $D_2$ and are directly connected to the collector of a second switching power transistor $Q_4$. The bases of transistors $Q_3$ and $Q_4$ are provided with input terminals 28 and 30, respectively. A voltage reducing resistor $R_3$ is interposed between the terminal 30 and the base of the transistor $Q_4$. Connected between the base and emitter of the transistor $Q_3$ is a resistor $R_1$ and windings 3–4 of the current transformer. Similarly, connected between the base and emitter of transistor $Q_4$ are a corresponding resistor $R_2$ and windings 8–7 of the current transformer. Further, the emitters of the transistors $Q_3$ and $Q_4$ are connected to a junction point A. Also connected to the junction point is a voltage averaging circuit comprising an inductor $L_1$ and a filtering capacitor $C_1$ connected to ground at 32. An output terminal 34 is adapted for connecting a load which is to be supplied a regulated DC voltage by the buck-boost circuit 10.

With further reference to FIG. 1, in block diagram form is shown master multivibrator 35 and a slave multivibrator 36 operatively coupled to the master multivibrator by a variable phase displacing magnetic amplifier 38. The master multivibrator is provided with output terminals 40 and 42 adapted to supply the terminals 24 and 26 of the inverter transistors. The slave multivibrator 36 is provided with output terminals 44 and 46 adapted to supply input terminals 28 and 30 of the power switching circuit transistors.

In operation of the circuit of FIG. 1, reference will be made to both FIGS. 1 and 2. An input DC signal $E_{IN}$, which signal is to be regulated, is provided at the terminal 16 of the input transformer. The squarewave output from the master multivibrator is supplied to terminals 24 and 26 of the inverter transistors. Accordingly, the input windings of the transformer $T_1$ is provided with the input DC voltage $E_{IN}$, graphically represented by the waveform 48 in FIG. 2, and the alternating squarewave voltage $E_B$ from the inverter 12, illustrated by the waveform 50 in FIG. 2. Accordingly, by autotransformer action input to the filter appears as a pulsating DC waveform with a voltage swing above and below the input voltage $E_{IN}$.

Figure 3:
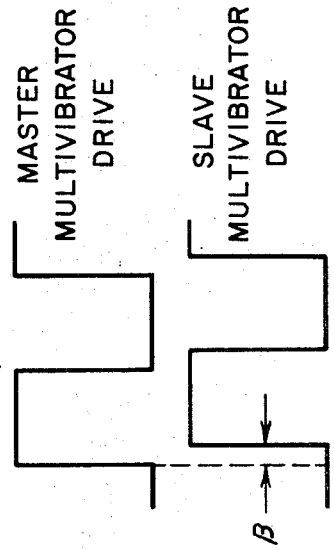
FIG. 3 is a graphic representation of the master slave multivibrator phase displaced outputs.

The power switching transistors $Q_3$ and $Q_4$ of the power switching circuit 10 alternately switch between conducting and non-conducting states in order to modify the relative durations between positive and negative voltage swing portions of the impressed waveform 50. More specifically, the terminals 28 and 30 of the switching power transistors receive the squarewave output from the slave multivibrator 36. But the operation of the slave multivibrator is purposely phase displaced by action of the magnetic amplifier 38 from the operation of the master multivibrator 35. Accordingly, switching between the power transistors $Q_3$ and $Q_4$ are phase displaced from the switching of the inverter transistors $Q_1$ and $Q_2$. Thus, as shown in FIG. 3, slave multivibrator drive is phase displaced from that of a master multivibrator drive by a phase control angle $\beta$ which is adjustably selected by the magnetic amplifier 38.

Analyzing the typical ideal output waveform of the power switching circuit, the output voltage $e_0$ thereof, as a function of the phase control angle $\beta$ can be obtained as follows:

$$e_0 = \frac{1}{T}\int_0^\alpha E_B dt + \int_\alpha^T -E_B dt + E_{IN}$$

wherein:

$e_0$ = average output voltage
$E_{IN}$ = input DC voltage
$E_B$ = secondary voltage of $T_1$
$T$ = time of one full voltage swing cycle
$\beta$ = phase control angle or time of negative portion of voltage swing cycle
$\alpha$ = time of positive portion of voltage swing cycle since $$\alpha = T - \beta$$

substituting gives:

$$e_0 = \frac{1}{T}\int_0^{T-\beta} E_B dt + \int_{T-\beta}^T -E_B dt + E_{IN}$$

integrating gives:

$$e_0 = \frac{E_B(T-2\beta)}{T} + E_{IN}$$

since $$E_B = E_{IN}\frac{N_s}{N_p}$$

wherein:

$N_p$ = primary turns of $T_1$
$N_s$ = secondary turns of $T_1$ then:

$$e_0 = \frac{E_{IN}\frac{N_s}{N_p}(T-2\beta)}{T} + E_{IN}$$

simplifying gives:

$$e_0 = E_{IN}\left[\frac{\frac{N_s}{N_p}(T-2\beta)}{T} + 1\right]$$

Thus the output voltage is seen to be a direct function of the phase control angle $\beta$ separating operation of the slave multivibrator from that of the master multivibrator. For phase control angles less than $T/2$ the average output voltage $e_0$ will be greater than the input voltage $E_{IN}$. Accordingly the circuits will be operating in a boost mode, the maximum boost mode occuring when $\beta$ equal zero. For control angles greater than $T/2$, the average output voltage $e_0$ will be less than the input voltage $E_{IN}$. Accordingly, the circuit will be operating in the buck mode, the maximum buck mode occurring when $\beta$ equals $T$. At a delay angle of $T/2$ the output voltage $e_0$ will equal the input $E_{IN}$. The circuit will then be operating in the neutral mode.

The particular operation of the power switching circuit 14 will now be explained in detail. Assume that the power transistor $Q_3$ is turned on by the slave multivibrator during the time interval when terminal 3 of the input transformer $T_1$ is more positive than the terminal 4. The voltage across winding 3–4 of the input transformer is thus added to the input, creating a boosted voltage or the positive portion of the voltage swing appearing at the collector of transistor $Q_3$. When $Q_3$ is turned on the boosted voltage is then applied to the averaging circuit comprising the inductor $L_1$ and the capacitor $C_1$. Conduction of $Q_3$ is maintained by base drive thereto supplied by the 3–4 windings of the current transformer CT1. At sometime later in the time interval, the master multivibrator 35 switches state, causing the polarities of the windings of input transformer T to change. Terminal 3 of the windings 3–4 of transformer $T_1$ becomes now more negative than terminal 4. Thus the voltage across windings 3–4 is opposite in polarity to the input DC voltage $E_{IN}$ applied at the transformer primary windings. Accordingly, the voltage across windings 3–4 represents a bucking voltage or the negative portion of the voltage swing to the input. Conduction of $Q_3$ is maintained by the 3–4 windings of the current transformer CT1, and a voltage less than the input voltage is applied to the averaging circuit. The power switching circuit 14 remains in this condition until the slave multivibrator changes state. At that time, base drive to transistor $Q_3$ is removed and after complete turn off of $Q_3$ base drive is applied to turn on the transistor $Q_4$. Conduction of $Q_4$ is maintained by base drive supplied by the 8–7 windings of the current transformer CT1. Accordingly, the operation of transistor $Q_4$ and its associated circuitry is identical to that of $Q_3$.

The output applied to junction A by the switching power transistors $Q_3$ and $Q_4$ appears as a variable pulse width waveform which is averaged by circuit $L_1$ and $C_1$. With reference to FIG. 2, the buck-boost regulator will operate in a boost mode when the waveform has the shape illustrated at 52. As shown in the figure, the phase control angle $\beta$ is selected to be less than the time interval $T/2$. Accordingly, the time intervals that transistors $Q_3$ and $Q_4$ provide a bucking voltage to the input is less than the time intervals that the transistors $Q_3$ and $Q_4$ provide a boosted voltage to the input. Accordingly, the square waveform 52 will have longer duration positive voltage swing portions than negative portions. The average waveform 52 will then provide an output voltage $e_0$ which is greater than the DC input voltage $E_{IN}$.

Figure 2:
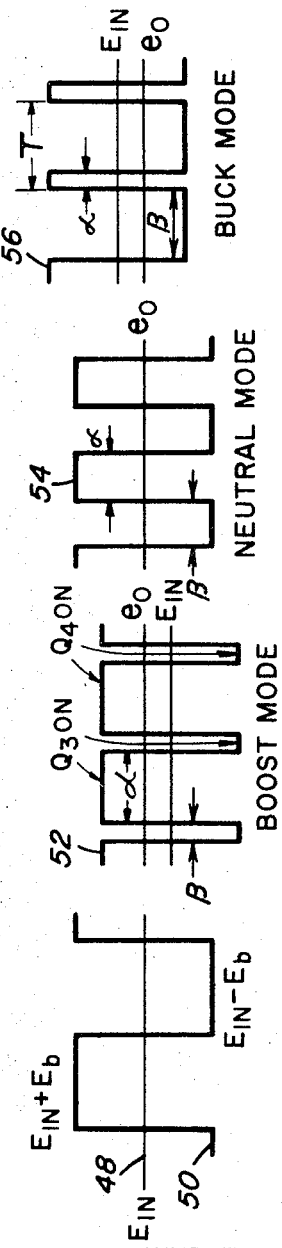
FIG. 2 is a graphic representation of the input and output waveforms of the circuit of FIG. 1 operating in either buck, boost or mutual modes.

If the phase control angle $\beta$ is selected to be equal to the time interval $T/2$, the outputs from the transistors $Q_3$ and $Q_4$ to the junction A will have the square waveform shape as shown at 54 in FIG. 2. Thus the waveform 54 will have equal positive and negative voltage swings and, when averaged by $L_1$ and $C_1$, the resultant output voltage $e_0$ will equal the DC input voltage $E_{IN}$.

With further reference to FIG. 2, it will be seen that the regulator will operate in its bucking mode if the outputs from the transistors $Q_3$ and $Q_4$ have the waveform shape illustrated at 56. In such case, the phase control angel $\beta$ is greater than the interval $T/2$, and the waveform 56 will have longer duration negative voltage swing portions than positive. Accordingly, the output voltage $e_0$ will be less than the input voltage $E_{IN}$. A special feature of the buck-boost regulator resides in the manner in which such voltage bucking function is accomplished. The inductor $L_1$ of the averaging circuit is specifically designed to maintain continuous current through either of the transistors $Q_3$ and $Q_4$ which is in its conducting state. The windings of the current transformer CT1 will thus continue to supply drive to the transistor maintained in conduction by the inductor $L_1$ during the time interval when the active secondary winding of transformer $T_1$ is opposite in polarity to the input. Thus the bucking function is achieved by maintaining conduction of either of the power transistors by utilizing a single current transformer and a filter inductor or alternatively an inductive load.

In addition to providing the bucking function, the current transformer and the power transistors of the switching circuit permit operation of the buck-boost regulator at high frequencies, up to 50 kHz. Operation at high frequencies permits substantial reduction in the size and weight of the averaging circuitry. Further, no long commutation time between the switching transistors is required, fast switching being achieved between the transistors and additionally, simultaneous conduction of the power transistors is prevented as follows:

If $Q_3$ is assumed as conducting, and its turn off is desired, base drive to the transistor as supplied from the current transformer winding 3–4 is instantaneously removed by detouring it through the controlling slave drive winding, through the resistors $R_1$, $R_3$ and $R_2$, and the windings 7–8 of the current transistor CT1 and back to terminal 4 of CT1. The ratio of resistor $R_3$ to $R_2$ and $R_1$ is selected such that $Q_4$ cannot be biased into conduction during this time. Once $Q_3$ turns off and the polarity of the windings of CT1 reverses, a forward bias is applied to $Q_4$. $Q_4$ then conducts forward current and is maintained in conduction by the appropriate windings of CT1. $Q_4$ cannot be turned on until $Q_3$ has turned completely off. Thus, no short circuit is applied to the windings of the power transformer $T_1$ and reflected back to the inverter. Accordingly, there is no interval of high-power dissipation which would otherwise limit the operational frequency of the regulator. Additionally, since fast switching is achieved, voltage control through a wide range of operating frequencies is possible.

In the circuit previously described, some advantages may be gained if the master multivibrator drives the power switching circuit and the slave multivibrator drives the inverter. Accordingly, the waveforms illustrated in FIG. 2 remain unchanged while the waveforms illustrated in FIG. 3 do become modified only by showing the phase angle $\beta$ as a phase advancement rather than a phase lag. Additionally, the phase advanced condition permits operation of the magnetic amplifier in its completely unsaturated condition to achieve a full boost operation, whereas in the circuit previously described, full magnetic amplifier saturation is required to achieve full boost operation.

Figure 4:
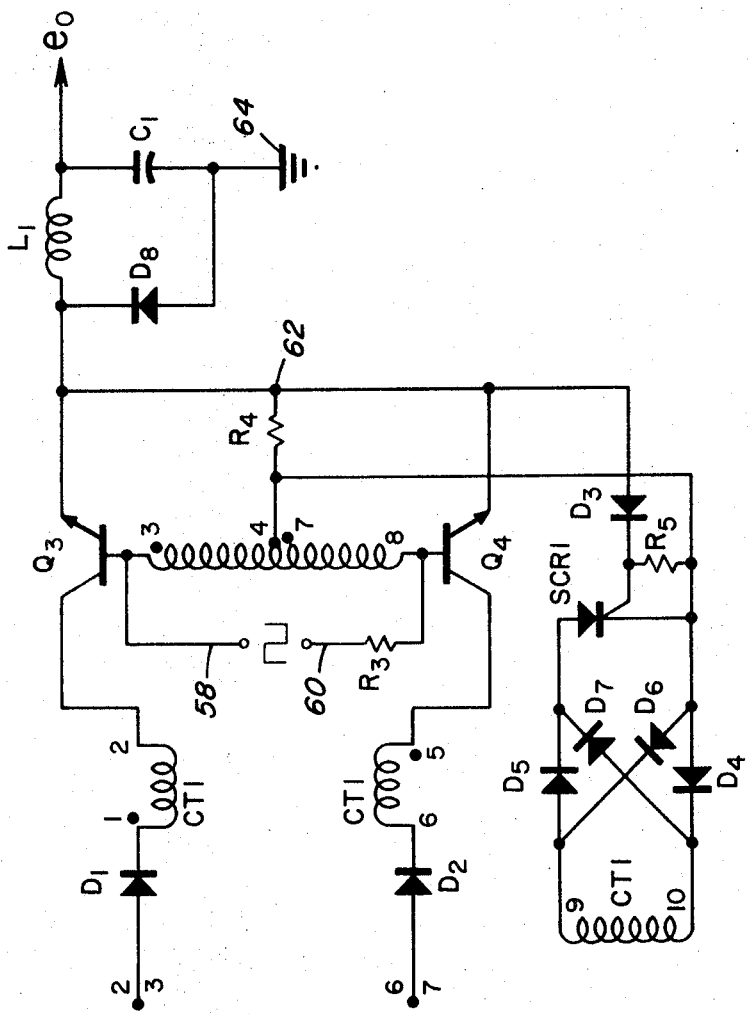
FIG. 4 is a modified power switching circuit of the circuit illustrated in FIG. 1.

With more particular reference to FIG. 4, a modified power switching circuit is illustrated for providing overload current protection. More specifically, the input diodes $D_1$ and $D_2$ are connected to the input transformer secondary windings at points 2–3 and 6–7, respectively. Input from the diode $D_1$ is applied, through windings 1–2 of a current transformer CT1, and then to a collector of a first power switching transistor $Q_3$. Input from the diode $D_2$ is applied through windings 6–5 of the current transformer CT1 to the collector of a second power switching transistor $Q_4$. The bases of transistors $Q_3$ and $Q_4$ are provided with terminals 58 and 60, respectively, which terminals are adapted to receive the output from a slave multivibrator, such as the slave multivibrator 36 described in conjunction with the circuit of FIG. 1. A voltage reducing resistor $R_3$ is interposed between the terminal 60 and the base of transistor $Q_4$. The modified power switching circuit thus far described is unchanged from the circuit of FIG. 1.

With further reference to FIG. 4, the power switching circuit thereof is modified from the circuit of FIG. 1 in the following manner:

The base of the power switching transistor $Q_3$ is provided with windings 3–4 of the current transformer CT1, and the base of transistor $Q_4$ is provided with windings 8–7 of the current transformer. The windings 3–4 and 8–7 are connected together to form a common terminal 4–7. Between this terminal and the emitters of both transistors $Q_3$ and $Q_4$ is interposed a resistor $R_4$ connected at 62. Terminal 4–7 and the resistor $R_4$ are connected to resistor $R_5$, the anodes of $D_4$ and $D_6$, and the cathode of SCR1. A diode $D_3$, for supplying a signal to the gate of SCR1 is connected from 62 to the gate of SCR1 and $R_5$. The anode and cathode of SCR1 is connected to windings 10–9 of the current transformer CT1 through a rectifier bridge comprising diodes $D_4$, $D_5$, $D_6$, and $D_7$.

The output from the power switching circuit is applied to a voltage averaging circuit comprising an inductor $L_1$ and an associated capacitor $C_1$ connected to ground at 64. Additionally, commutating diode $D_8$ is connected between the input to the averaging circuit and to ground at 64. The average output therefrom is a controlled DC output $e_0$ as illustrated in the figure.

In operation of the circuit, assume $Q_3$ is conducting and the current transformer CTI is providing base drive to the transistor $Q_3$ through the winding 3–4. The current produced by winding 3–4 causes a voltage drop across resistor $R_4$, which under normal load conditions is not sufficient to gate on SCR1. It is noted that when the load current increases, a corresponding current increase will be reflected in the windings 3–4. But, when the load current increases to a pre-selected level where overload protection therefor is desired, a reflected corresponding current increase through windings 3–4 increases the voltage drop across resistor $R_4$ to a level which gates SCR1 to a conducting state. This applies a low impedance to CT1 through winding 9–10. By using a high-turns ratio of winding 9–10 to winding 1–2, the effects of the voltage drops across the bridge rectifier diodes and SCR1 are minimized. The current which was coupled to winding 3–4 becomes now coupled to winding 9–10 and is consequently reduced to zero. Base drive to $Q_3$ is thus reduced to zero, causing $Q_3$ to turn off. The slave multivibrator drive supplied through $R_3$ cannot provide base drive to $Q_3$ or $Q_4$ to render them conducting since the low impendance series path through CT1 windings 7–8 and 3–4 is present.

Additionally, upon turn off of transistor $Q_3$, current flow through the current transformer winding 1–2 and, correspondingly, the flow through winding 9–10 is extinguished. As a result, the current flow through SCR1 drops below its holding current level and the SCR is returned to its blocking state. This enables the power switching circuit to assume its normal operation whereby transistor $Q_3$ or $Q_4$ is turned on by a signal from the slave multivibrator supplied through resistor $R_3$. Such resumed normal operation permits the load current to be sampled for the pre-selected overload condition.

Whereas, the circuit illustrated in FIG. 4 has been described with the slave multivibrator operating the power switching circuit and the master multivibrator connected to the inverter, it is understood that the roles of the multivibrators may be reversed as described in conjunction with the circuit of FIG. 1. Such operation will, as described previously, cause a phase advanced operation of the power switching circuit rather than a phase lag operation.

Although preferred embodiments of the present invention have been described, it should be understood that the spirit and scope of the invention as limited by the recitations of the appended claims may include other embodiments. For example, if regulation is desired for overload current conditions, the magnetic amplifier 38 may be provided with a current regulating control winding for overriding the voltage control signal from the slave multivibrator. Additionally, multiple chopper circuits with individually controlled switching can be used in addition to the single chopper circuit shown in order to provide a number of regulated outputs. Accordingly, the spirit and scope of the present invention is restricted only by the recitations of the appended claims wherein:

What is claimed is:

1. A buck-boost voltage control circuit comprising a DC voltage source, an AC voltage source in series with said DC source, a pair of alternately conducting transistors, first current transformer windings for supplying base drive to one of said transistors, second transformer windings of opposite polarity with respect to said first windings for supplying base drive to the other of said transistors, a switching means connected to said first and second transistors, phase displacing means connecting said AC voltage source and said pair of alternatingly conducting transistors, a transformer magnetically coupling said transistors to said DC voltage source and said AC voltage source, and voltage averaging means connecting to the emitters of said transistors.

2. The structure of claim 1, wherein said phase displacing means is adjustable for varying the phase displacement between said switching means and said AC voltage source.

3. The structure as recited in claim 2, wherein said voltage averaging circuit includes a current sustaining inductor for maintaining conduction of the conducting one of said transistors.

4. The structure as recited in claim 1, wherein said AC voltage source comprises an inverter, said switching means comprises a slave multivibrator, and further including, a master multivibrator connected to said inverter, said phase displacing means comprising a magnetic amplifier connected between said master multivibrator and said slave multivibrator.

5. The structure as recited in claim 1, and further including: a resistor connecting the junction of said first and said second current transformer windings to the emitters of said transistors, a silicon controlled rectifier, a diode connecting the gate of said silicon controlled rectifier to the junction of the emitters of first and second transistors, a voltage reducing resistor connecting the junction of said diode and said gate to the emitters of first and second transistors, third current transformer winding connected between the anode and cathode of said silicon controlled rectifier, and rectifier bridge means interposed between said third current transformer winding and said silicon controlled rectifier for generating in said third transformer winding a low impedance load reflected to that of said first and said second current transformer windings upon conduction of said silicon controlled rectifier.

6. The structure as recited in claim 1, wherein the switching means comprises a master multivibrator and further including, a slave multivibrator connected to said inverter, said phase displacing means comprising a magnetic amplifier connected between said master multivibrator and said slave multivibrator.

References Cited

UNITED STATES PATENTS

| | | | |
|---|---|---|---|
| 3,074,000 | 1/1963 | Salihi | 321—2X |
| 3,175,160 | 3/1965 | Pintell | (321—27M/S) |
| 3,219,906 | 11/1965 | Keller et al. | 321—2X |
| 3,334,292 | 8/1967 | King et al. | 321—45 |

J D MILLER, Primary Examiner

G. GOLDBERG, Assistant Examiner

U.S. Cl. X.R.

321—20; 323—45